US012371332B1

(12) United States Patent
Ahmed

(10) Patent No.: US 12,371,332 B1
(45) Date of Patent: Jul. 29, 2025

(54) PARTICULATE NANOCOMPOSITE MATERIAL

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/073,994

(22) Filed: Mar. 7, 2025

(51) Int. Cl.
*C01B 33/20* (2006.01)
*C01B 33/18* (2006.01)

(52) U.S. Cl.
CPC .............. *C01B 33/20* (2013.01); *C01B 33/18* (2013.01); *C01P 2002/60* (2013.01); *C01P 2002/72* (2013.01); *C01P 2002/85* (2013.01); *C01P 2004/03* (2013.01); *C01P 2004/30* (2013.01); *C01P 2004/64* (2013.01)

(58) Field of Classification Search
None
See application file for complete search history.

(56) References Cited

U.S. PATENT DOCUMENTS

2006/0293430 A1 12/2006 Wang et al.

FOREIGN PATENT DOCUMENTS

WO WO 2022/248402 A1 12/2022

OTHER PUBLICATIONS

Grigorie et al. ("ZnO—SiO2 based nanocomposites prepared by a modified sol-gel method". Materials Chemistry and Physics, 2016, pp. 1-8) (Year: 2016).*

Saod et al ("Zinc oxide—mesoporous silica nanocomposite: preparation, characterization and application in water treatment for lead, cadmium and chromium removal". International Journal of Environmental Analytical Chemistry, vol. 104, Issue 20, 2024, pp. 9772-9784 (Year: 2024).*

Wahran M. Saod, et.al., "Zinc oxide—mesoporous silica nanocomposite: preparation, characterisation and application in water treatment for lead. cadmium and chromium removal", International Journal of Environmental Analytical Chemistry vol. 104, Issue 20, 2024, pp. 9772-9784 (14 pages).

Alexandra Carmen Grigorie, et.al., "ZnO—SiO2 based nanocomposites prepared by a modified sol-gel method", Materials Chemistry and Physics, 2016 (8 pages).

(Continued)

*Primary Examiner* — Michael Forrest
(74) *Attorney, Agent, or Firm* — Oblon, McClelland, Maier & Neustadt, L.L.P.

(57) ABSTRACT

A particulate nanocomposite material comprising: a lead (II) orthosilicate ($Pb_2SiO_4$) crystalline phase in an amount ranging from about 5 weight percent (wt. %) to 20 wt. %; a rhombohedral zinc orthosilicate ($Zn_2SiO_4$) crystalline phase in an amount ranging from about 5 wt. % to 20 wt. %; and, a tetragonal silicon dioxide ($SiO_2$) crystalline phase in an amount of from about 60 wt. % to about 90 wt. %, wherein wt. % is calculated based on the total weight of the $Pb_2SiO_4$, $Zn_2SiO_4$, and $SiO_2$ phases.

20 Claims, 4 Drawing Sheets

(56) References Cited

OTHER PUBLICATIONS

Rishay Garg, et.al., "Biosynthesized silica-based zinc oxide nanocomposites for the sequestration of heavy metal ions from aqueous solutions", Journal of King Saud University Science, vol. 34, Issue 4, Jun. 2022 (8 pages).
Oana-Cătălina Mocioiu, et.al., "The Influence of Gel Preparation and Thermal Treatment on the Optical Properties of SiO2—ZnO Powders Obtained by Sol-Gel Method", Gels, 2022, vol. 8 Issue 8, 498 (12 pages).

* cited by examiner

PARTICULATE NANOCOMPOSITE MATERIAL

BACKGROUND

Technical Field

The present disclosure is directed to the fabrication of a nanocomposite material, and more particularly, to a particulate nanocomposite material and method of using the particulate nanocomposite material for immobilizing inorganic contaminants and to a method of preparation thereof.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The use of nanocomposite materials for environmental remediation has been extensively studied, with various researchers focusing on the synthesis and application of different nanostructures for pollutant removal. Existing technologies often provide for the use of silica-based composites, zinc silicates, and lead silicates-either separately or in combination—but to date have lacked the optimized multi-functional characteristics required to effectively address complex environmental challenges. Previous research has highlighted the potential of silica-based materials based on their high surface area and stability, of zinc silicates based on their adsorption and catalytic properties, and of lead silicates based on their facile structural integration into composite matrices. However, despite the aforementioned research, significant gaps remain in achieving a synergistic integration of these materials into a single nanocomposite with tailored structural and functional properties.

Current solutions frequently exhibit limitations in adsorption capacity, the scalability of production methods, and the adaptability of the provided materials across a wide range of environmental conditions. For instance, the ability of such materials to handle heavy metal pollutants, such as cadmium ions, has not been evidenced. Moreover, the plurality of the existing synthesis methods are either overly complex, require high energy inputs, or involve costly precursors, which restrict their practical application in large-scale environmental remediation. The aforementioned drawbacks underscore the critical need for innovative approaches that may overcome the challenges faced, while delivering high-performance materials suitable for diverse applications.

Accordingly, one object of the present disclosure is to provide a particulate nanocomposite material, and a method of synthesizing thereof, that may circumvent the drawbacks and limitations—such as high energy consumption, lengthy processing times, costly precursors, agglomeration, and scalability issues—of the materials and methods already known in the art.

SUMMARY

In an exemplary embodiment, a particulate nanocomposite material is described. The nanocomposite comprises, as determined by X-ray diffraction (XRD): a lead (II) orthosilicate ($Pb_2SiO_4$) crystalline phase in an amount ranging from about 5 percent by weight (wt. %) to 20 wt. %; a rhombohedral zinc orthosilicate ($Zn_2SiO_4$) crystalline phase in an amount about 5 wt. % to 20 wt. %; and, a tetragonal silicon dioxide ($SiO_2$) crystalline phase in an amount ranging from about 60 wt. % to about 90 wt. %, wherein wt. % is based on the total weight of the $Pb_2SiO_4$, $Zn_2SiO_4$ and $SiO_2$ phases.

In some embodiments, the nanocomposite has a volume average crystallite size, as determined by XRD, of from about 75 nanometers (nm) to about 80 nm.

In some embodiments, the nanocomposite has a volume average crystallite size, as determined by XRD, of from about 78 nm to about 80 nm.

In some embodiments, the material is in the form of particles having a heterogeneous morphology.

In some embodiments, the nanocomposite includes, as determined by scanning electron microscopy (SEM), substantially spherical particles, polygonal particles of a substantially cuboid shape, substantially acicular particles and aggregates thereof.

In some embodiments, the nanocomposite has a median grain size of from about 300 nm to about 500 nm, as determined by SEM.

In some embodiments, the nanocomposite has a median grain size of from about 350 nm to about 450 nm, as determined by SEM.

In some embodiments, the Pb is present in an amount of from about 1 to about 5 atom % of the nanocomposite material, based on the total number of atoms in the particulate composite material and as determined by energy dispersive X-ray (EDX) elemental analysis.

In some embodiments, the Zn is present in an amount of from about 1 to about 5 atom % of the nanocomposite material, based on the total number of atoms in the particulate composite material and as determined by EDX elemental analysis.

In another exemplary embodiment, a method for preparing the particulate nanocomposite material is described. The method comprises: forming an aqueous solution of a zinc salt, a lead salt and at least one silicate ester of the formula $R_{(4-x)}Si(OR^1)_x$, wherein R and $R^1$ are each independently $C_1$-$C_8$ alkyl and x is an integer of from 1 to 4; adding aqueous ammonia to the aqueous solution and stirring the obtained mixture for a duration of from about 0.1 to about 2 hours to form a gel; filtering the gel, washing the obtained residue with water and heating the washed residue under stirring at a temperature of from about 80° C. to about 200° C. for a sufficient duration to form a dry powder; and, calcining the dry powder at a temperature of from about 700 to about 1000° C. to form the nanocomposite material.

In some embodiments, the zinc salt is selected from the group consisting of zinc sulfate ($ZnSO_4$), zinc nitrate ($Zn(NO_3)_2$), zinc chloride ($ZnCl_2$) and zinc acetate ($Zn(CH_3COO)_2$).

In some embodiments, the zinc salt is zinc nitrate ($Zn(NO_3)_2$).

In some embodiments, the lead salt is selected from the group consisting of lead (II) sulfate ($PbSO_4$), lead (II) nitrate ($Pb(NO_3)_2$), lead (II) chloride ($PbCl_2$) and lead (II) acetate ($Pb(CH_3COO)_2$).

In some embodiments, the lead salt is lead (II) nitrate ($Pb(NO_3)_2$).

In some embodiments, R and $R^1$ are each independently $C_1$-$C_6$ alkyl and x is an integer of from 2 to 4.

In some embodiments, the aqueous solution includes at least one silicate ester selected from the group consisting of tetramethyl orthosilicate ($Si(OCH_3)_4$), methyltriethoxy orthosilicate ($Si(CH_3)(OC_2H_5)_3$), tetraethyl orthosilicate ($Si(OCH_5)_4$), and mixtures thereof.

In some embodiments, the aqueous solution comprises tetraethyl orthosilicate ($Si(OC_2H_5)_4$).

In some embodiments, the aqueous ammonia is added in a dropwise manner to the aqueous solution.

In some embodiments, the dry powder is calcined at a temperature of from about 800 to about 900° C. for a duration of from about 2 to about 4 hours to form the nanocomposite material.

In yet another exemplary embodiment, there is provided a method of immobilizing inorganic contaminants disposed in an aqueous medium, the method comprising contacting the aqueous medium with the particulate nanocomposite material as described herein above.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
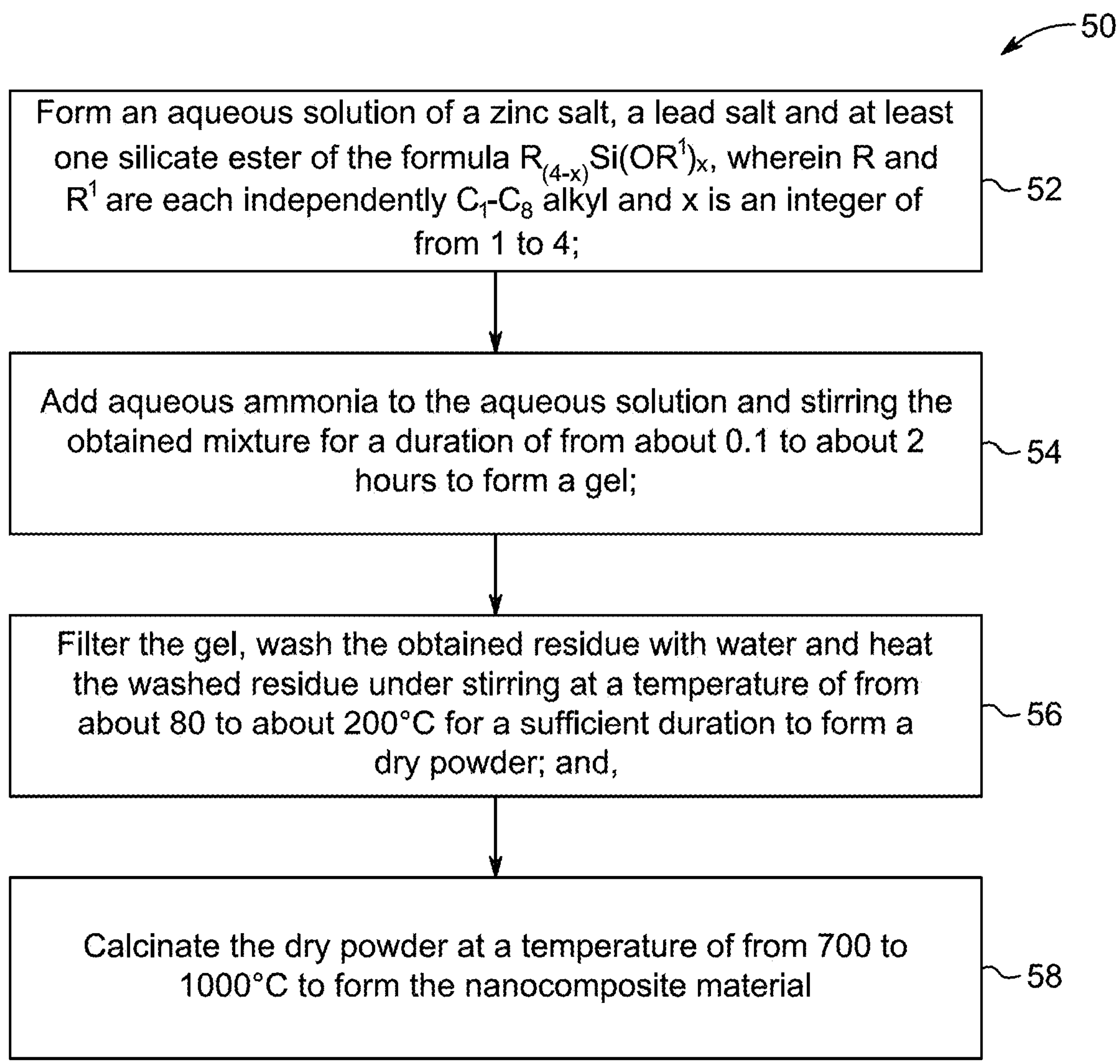
FIG. 1 illustrates an exemplary flow chart depicting a method of preparing a particulate nanocomposite material, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

The terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Furthermore, when amounts, concentrations, dimensions and other parameters are expressed in the form of a range, unless specifically stated, the range is considered to be continuous within the numerical value interval, and thereby includes two numerical value endpoints of the provided range, and each numerical value between said two numerical value endpoints.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., 1° C.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term 'amount' refers to the level or concentration of one or more reactants, catalysts, or materials present in a reaction mixture.

As used herein, the term 'particle' refers to a small object that acts as a whole unit with regard to its transport and properties. As used herein, 'nanoparticles'—sometimes contracted herein to NPs—refers to particles having a particle size of 1 nanometer (nm) to 1000 nm.

Unless otherwise stated, the term 'particle size' refers to the largest axis of the particle. In the case of a generally spherical particle, the largest axis is the diameter.

The term 'median volume particle size' (Dv50), as used herein, refers to a particle size corresponding to 50% of the volume of the sampled particles being greater than and 50% of the volume of the sampled particles being smaller than the recited Dv50 value. Similarly, if used, the term 'Dv90' refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term 'nanocomposite' refers to a composite material in which at least one dimension of the component is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material. The definition within the scope of the invention includes porous media, colloids, gels, copolymers, and solid combination of a bulk matrix and nanodimensional phase(s) differing in properties due to dissimilarities in structure and chemistry. The nanocomposite morphologies that are generally prepared include phase separated systems, intercalated systems, and exfoliated systems.

As used herein, the term 'room temperature' refers to a temperature range of '23 degrees Celsius (° C.)±2° C. in the present disclosure. As used herein, 'ambient conditions' means the temperature and pressure of the surroundings in which the substance, composition or article is located.

As used herein, the term 'fraction' refers to a numerical quantity which defines a part up to but not including 100 percent or the entirety of the thing in question.

As used herein the term 'disposed' refers to being positioned, placed, deposited, arranged or distributed in a particular manner.

As used herein, the number average molecular weight (Mn) and weight average molecular weight (Mw) are determined by gel permeation chromatography (GPC) with tetrahydrofuran (THF) as the eluent in accordance with DIN 55672-1:2007-08.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, especially for crystalline materials.

A rhombohedral crystalline phase refers to a crystal lattice which has no angles equal to 90°, but of which all sides are of equal length (a=b=c), thus requiring only by one lattice parameter. All three angles are equal ($\alpha=\beta=\gamma$).

A tetragonal crystalline phase refers to a crystal structure in which the unit cell of the lattice has two axes of equal-length and a third axis that is of different length, but wherein all axes are at right angles (90°) to each other. This crystal system may be represented as a square base (with two equal axes) and a height (the third axis) which is different, resulting in a rectangular prism-like shape. The tetragonal crystal structure possesses a four-fold rotational symmetry around its unique axis.

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

As used herein, the term "atomic concentration" refers to the proportion or percentage of a specific element in a material, calculated based on the number of atoms of that element relative to the total number of atoms present in the material. It is typically expressed as a percentage (%) or as an atomic fraction. This measurement may be determined using the exemplary techniques of X-ray fluorescence (XRF), energy-dispersive X-ray spectroscopy (EDX), or inductively coupled plasma mass spectrometry (ICP-MS). Where stated herein, atomic concentration is determined using energy-dispersive X-ray spectroscopy (EDX).

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

The term 'dropwise' as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

The term 'sol' as used herein, refers to a colloidal suspension of solid particles in a continuous liquid medium.

As used herein, the term 'gel' refers to a viscoelastic or semi-solid phase that may form when a sol undergoes a transition to a more structured, three-dimensional network. This transition may occur through polymerization or cross-linking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

As used herein, the term 'calcination' refers to a thermal treatment process which is conducted in the absence of, or under a restricted supply of ambient oxygen. This is performed to remove impurities or volatile substances and/or to induce thermal decomposition or a change in the thermally treated material.

As used herein, '$C_1$-$C_n$ alkyl' group refers to a monovalent group that contains from 1 to n carbons atoms, that is a radical of an alkane and includes straight-chain and branched organic groups. As such, a '$C_1$-$C_4$ alkyl' group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

The term 'alkylene' refers to a divalent radical derived from an alkyl group as defined above.

The term 'polyoxyalkylene'-alternatively referenced as polyalkylene oxide-refers herein to an aliphatic polyether which is built from repeated-O-A-units, wherein A is alkylene, for instance $C_2$-$C_5$ alkylene. The term 'polyoxy($C_2$-$C_3$)alkylene' encompasses polyoxyethylene, polyoxypropylene and poly(oxyethylene-co-oxypropylene).

The term 'polyol' as used herein shall include diols and higher functionality hydroxyl compounds. The term 'polyether polyol' refers to a compound, which may be linear or branched, that contains at least two ether groups and at least two hydroxyl groups. The term 'polyester polyol' references a polymeric compound, which may be linear or branched, that contains at least two ester linkages and at least two hydroxyl groups. Correspondingly, the term 'poly(ether-ester) polyol' refers to a polyol containing both ether linkages (C—O—C) and ester linkages (R—COO—R) within its structure.

The term 'hydroxyl number' as used herein is defined as the mass in milligrams of potassium hydroxide required to neutralize the acetic acid taken up on acetylation of one gram of a chemical substance that contains free hydroxyl groups. Where stated, the hydroxyl number is determined in accordance with ASTM D4274-11.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers.

Aspects of this disclosure pertain to a particulate nanocomposite material of $SiO_2/Zn_2SiO_4/Pb_2SiO_4$ fabricated by a facile sol-gel method is described. The particulate nanocomposite material of the present disclosure offers superior heavy metal adsorption and scalability for sustainable water purification.

A particulate nanocomposite material is described which exhibits a $Pb_2SiO_4$ crystalline phase, a rhombohedral $Zn_2SiO_4$ crystalline phase, and a tetragonal $SiO_2$ crystalline phase.

In some embodiments, based on the total weight of the $Pb_2SiO_4$, $Zn_2SiO_4$, and $SiO_2$ phases, the $Pb_2SiO_4$ crystalline phase is present in an amount of from about 5 to about 20 wt. %, for example about 5-7 wt. %, about 8-12 wt. %, about 10-15 wt. %, about 12-18 wt. %, or about 15-20 wt. %. In a preferred embodiment, the $Pb_2SiO_4$ crystalline phase is present in an amount of 14.50 wt. % based on the total weight of the $Pb_2SiO_4$, $Zn_2SiO_4$, and $SiO_2$ phases.

In some embodiments, based on the total weight of the $Pb_2SiO_4$, $Zn_2SiO_4$, and $SiO_2$ phases, the rhombohedral $Zn_2SiO_4$ crystalline phase is present in an amount of from about 5 to about 20 wt. %, for example about 5-7 wt. %, about 8-12 wt. %, about 10-15 wt. %, about 12-18 wt. %, or about 15-20 wt. %. In a preferred embodiment, the rhombohedral $Zn_2SiO_4$ crystalline phase is present in an amount of 12.50 wt. % based on the total weight of the $Pb_2SiO_4$, $Zn_2SiO_4$, and $SiO_2$ phases.

In some embodiments, based on the total weight of the $Pb_2SiO_4$, $Zn_2SiO_4$, and $SiO_2$ phases, the tetragonal $SiO_2$ crystalline phase is present in an amount of from about 60 to about 90 wt. %, for example about 60-65 wt. %, about 65-70 wt. %, about 70-80 wt. %, about 75-85 wt. %, or about 80-90 wt. %. In a preferred embodiment, the tetragonal $SiO_2$ crystalline phase is present in an amount of 73 wt. % based on the total weight of the $Pb_2SiO_4$, $Zn_2SiO_4$, and $SiO_2$ phases.

In some embodiments, the particulate nanocomposite material has a volume average crystallite size, as determined by X-ray diffraction, of from about 75 to 80 nm, for example about 76-80 nm, about 77-80 nm, about 78-80 nm, or about 78-79 nm. In a preferred embodiment, the volume average crystallite size of the particulate nanocomposite material, as determined by X-ray diffraction, is 78.78 nm.

The nanocomposite is in the form of particles. It is envisaged, for example, that particles of that are fibrous, acicular, spherical, ellipsoidal, cylindrical, bead-like, cuboidal, cubic or platelet-like may be present alone or in combination in the composite. Moreover, it is envisaged that agglomerates of particles having the same or different morphologies may be present in the nanocomposite. In a preferred embodiment however, the nanocomposite material demonstrates a heterogeneous morphology. More particularly, as observed through Scanning Electron Microscopy, the particulate nanocomposite material may desirably comprise substantially spherical particles, polygonal particles with a cuboid-like shape, acicular particles, and aggregates thereof.

In some embodiments, the particulate nanocomposite material has a median grain size of from about 300 to about 500 nm, for example about 350-450 nm, about 375-425 nm, about 380-420 nm, or about 390-410 nm, as determined by Scanning Electron Microscopy. In a preferred embodiment, the median grain size of the particulate nanocomposite material is approximately 401.05 nm, as determined by Scanning Electron Microscopy.

In some embodiments, the atomic concentration of oxygen in the nanocomposite material is from about 50 to about 70 atom %, for example about including 50-65 atom %, 55-65 atom %, or about 58-62 atom %, based on the total number of atoms in the particulate composite material and as determined by Energy Dispersive X-ray (EDX) elemental analysis. In a preferred embodiment, the atomic concentration of oxygen in the nanocomposite material is 60.50% of the total number of atoms.

In some embodiments, the atomic concentration of silicon in the nanocomposite material is from about 30 to 50 atom %, for example about 30-40 atom %, about 32-40 atom %, about 34-40 atom %, 34-38 atom %, or about 35-37 atom %, based on the total number of atoms in the particulate composite material and as determined by Energy Dispersive X-ray (EDX) elemental analysis. In a preferred embodiment, the atomic concentration of silicon in the nanocomposite material is 36.20 atom % of the total number of atoms.

In some embodiments, the atomic concentration of zinc in the nanocomposite material is from about 1 to about 10 atom %, for example about 1-5 atom %, about 1-4 atom %, about 1-3 atom %, or about 1-2 atom %, based on the total number of atoms in the particulate composite material and as determined by Energy Dispersive X-ray (EDX) elemental analysis. In a preferred embodiment, the atomic concentration of zinc in the nanocomposite material is 1.11 atom % of the total number of atoms.

In some embodiments, the atomic concentration of lead in the nanocomposite material from about 1 to about 10 atom %, for example about 1-5 atom %, about 1-4 atom %, about 1-3 atom %, or about 2-3 atom %, based on the total number of atoms in the particulate composite material and as determined by Energy Dispersive X-ray (EDX) elemental analysis. In a preferred embodiment, the atomic concentration of lead in the nanocomposite material is 2.19 atom % of the total number of atoms.

FIG. 1A illustrates a schematic flow chart of a method 50 of preparing particulate nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes forming an aqueous solution of a zinc salt, a lead salt and at least one silicate ester of the formula $R_{(4-x)}Si(OR^1)_x$, wherein: R and $R^1$ are each independently selected from $C_1$-$C_8$ alkyl; and, x is an integer of from 1 to 4. In certain embodiments: R and $R^1$ are each independently selected from $C_1$-$C_6$ alkyl; and, x is an integer of from 2 to 4. In other embodiments, R and $R^1$ are each independently selected from $C_1$-$C_4$ alkyl; and, x is an integer of from 2 to 4. Exemplary silicate esters having utility in the method either alone or in combination include, but are not limited to: tetramethyl orthosilicate ($Si(OCH_3)_4$); methyltriethoxy orthosilicate ($Si(CH_3)(OC_2H_5)_3$); and, tetraethyl orthosilicate ($Si(OC_2H_5)_4$). In a preferred embodiment, aqueous solution includes tetraethyl orthosilicate ($Si(OC_2H_5)_4$).

Exemplary zinc salts having utility in the present disclosure and which may be used alone or in combination, include, but are not limited to, zinc sulfate, zinc chloride, zinc acetate, zinc carbonate, zinc oxide, zinc bromide, zinc hydroxide, zinc phosphide, zinc sulfide, zinc gluconate, zinc lactate, zinc stearate, zinc formate, zinc citrate, zinc iodide, zinc percarbonate, zinc pyrophosphate, zinc tungstate, zinc aluminate, zinc metasilicate, zinc acetate dihydrate, zinc hydroxide chloride, zinc metaborate, zinc oxalate, zinc benzoate, zinc tartrate, zinc perchlorate, zinc butyrate, zinc salicylate, zinc valerate, zinc meso-tartrate, zinc propionate, and zinc humate. In some embodiments, the zinc salt may be selected from the group consisting of zinc sulfate, zinc nitrate, zinc chloride and zinc acetate. In a preferred embodiment, the zinc salt is zinc nitrate ($Zn(NO_3)_2$).

Exemplary lead salts having utility in the present disclosure, and which may be used either alone or in combination, include, but are not limited to, lead (II) acetate, lead (II) chloride, lead (II) sulfate, lead (II) carbonate, lead (II) oxide, lead (II) bromide, lead (II) iodide, lead (II) formate, lead (II) phosphate, lead (II) chromate, lead (II) sulfide, lead (II) citrate, lead (II) stearate, lead (II) carbonate hydroxide, lead (II) perchlorate, lead (II) tartrate, lead (II) lactate, lead (II) benzoate, lead (II) oxide carbonate, lead (II) ascorbate, lead (II) gluconate, lead (II) salicylate, lead (II) nitrate hydrate, lead (II) pyrophosphate, lead (II) molybdate, lead (II) tungstate, lead (II) borate, lead (II) metasilicate, lead (II) propionate, lead (II) fumarate, lead (II) citraconate. In some embodiments, the lead (II) salt is selected from the group consisting of lead (II) sulfate, lead (II) nitrate, lead (II) chloride, and lead (II) acetate. In a preferred embodiment, the lead salt is lead (II) nitrate ($Pb(NO_3)_2$).

At step 54, the method 50 includes adding aqueous ammonia to the aqueous solution and stirring the obtained mixture for a duration of from about 0.1 to about 2 hours to form a gel. In an embodiment of the present disclosure, aqueous ammonia is added in a dropwise manner to the aqueous solution. In some embodiments, aqueous ammonia may be added to the aqueous solution with continuous stirring for a duration ranging from 0.1 to 2 hours, for example about 0.1-1.0 hours, 0.2-1.0 hours, 0.3-0.9 hours, or 0.4-0.6 hours. In a preferred embodiment, aqueous ammonia solution was added to aqueous solution with continuous stirring for 30 minutes.

At step 56, the method 50 includes filtering the gel, washing the obtained residue with water and heating the washed residue under stirring at a temperature of about 80 to about 200° C. for a sufficient duration to form a dry powder. In some embodiments, the washed residue is heated at a temperature ranging from about 80 to about 180° C., about 80-150° C. or about 80 to about 120° C. to form a dry powder. In a preferred embodiment, the washed residue is heated at 100° C. to form a dry powder.

In some embodiments, the washed residue is heated for a duration ranging from about 5 to about 8 hours, for example about 5 to about 7 hours to form a dry powder. In a preferred embodiment, the washed residue is heated for 6 hours to form a dry powder.

At step 58, the method 50 includes calcining the dry powder at a temperature of about 700 to about 1000° C. to form the nanocomposite material. In some embodiments, the dry powder is calcined at a temperature ranging from about 700 to 900° C., for example about 750-900° C., or about 800-900° C., to form the nanocomposite material. In a preferred embodiment, the dry powder is calcined at a temperature of 850° C.

In some embodiments, the dry powder is calcined for a duration of from about 2 to about 4 hours, for example about 2.5-3.5 hours, or from 2.8-3.2 hours, to form the nanocomposite material. In a preferred embodiment, the dry powder is calcined for 3 hours to form the nanocomposite material.

A method of immobilizing inorganic contaminants disposed in an aqueous medium is described. The method comprises contacting the aqueous medium with the particulate nanocomposite material.

The methods of immobilizing inorganic contaminants from an aqueous medium containing said contaminants will typically requires the aqueous medium to be brought into contact with the particulate nanocomposite material for a sufficient contact time to permit adsorption of the species concerned. In some embodiments, the contact time of the aqueous medium with the amount of particulate nanocomposite material is from about 0.5-5 hours, for example about 1-4.5 hours, about 1.5-4 hours, about 2-3.5 hours, or about 2.5-3 hours.

In some embodiments, the aqueous medium is contacted with an amount of the particulate nanocomposite material of from about 0.05 to about 1 wt. %, based on the weight of the aqueous medium. For example, the amount of the particulate nanocomposite material may be from about 0.10-0.95 wt. %, about 0.15-0.90 wt. %, about 0.20-0.85 wt. %, about 0.25-0.80 wt. %, about 0.30-0.75 wt. %, about 0.35-0.70 wt. %, about 0.40-0.65 wt. %, about 0.45-0.60 wt. %, and or about 0.50-0.55 wt. %, based on the weight of the aqueous medium.

The aqueous medium may be provided as a static volume in which the amount of the particulate nanocomposite material is dispersed. In an alternative embodiment, the aqueous medium may be provided as fixed volume in which the particulate nanocomposite material is dispersed but which is subjected to agitation: the particulate material may be suspended in the volume or may be constrained within a bed or membrane or by a support. In a further non-limiting alternative, the aqueous medium may be provided as a flow which contacts the particulate nanocomposite material. In this embodiment, the particulate nanocomposite material may need to be constrained within a bed or membrane which the aqueous medium contacts as either a perpendicular or tangential (cross-) flow stream.

It is envisaged that the nanocomposite immobilized inorganic contaminants may include radioactive nuclides, toxic metals, nutrients, salts, heavy metals, metalloids, inorganic water contaminants, inorganic soil contaminants, food and pharmaceutical adulterations.

In some embodiments, the method 50 includes immobilizing inorganic contaminants for the purpose of wastewater treatment, sewage treatment, or water treatment used for drinking. In some embodiments, the method 50 includes immobilizing the non-biodegradable synthetic chemicals for pollution control and environmental pollution remediation.

In some embodiments, the method 50 includes immobilizing a combination of inorganic and organic contaminants present in an aqueous medium.

It is considered that the nanocomposite material of the present disclosure, as obtainable by the method 50, may further act as a nanocatalyst or a nanosorbents, as a nanosensor for contaminants, in water disinfection and in contaminant and pollutant immobilization, sensing and detection.

The following examples are provided solely for illustration and are not to be construed as limitations of the present disclosure, as many variations thereof are possible without departing from the spirit and scope of the present disclosure.

EXAMPLES

The following examples demonstrate a particulate nanocomposite $SiO_2/Zn_2SiO_4/Pb_2SiO_4$, synthesized using a sol-gel method, for the immobilization of inorganic contaminants. The examples are provided solely for illustration and are not to be construed as limitations of the present disclosure, as many variations thereof are possible without departing from the spirit and scope of the present disclosure.

Example 1: Synthesis of $SiO_2/Zn_2SiO_4/Pb_2SiO_4$ Nanocomposite Using Sol-Gel Method The $SiO_2/Zn_2SiO_4/Pb_2SiO_4$ nanocomposite was synthesized using a sol-gel method. The process comprised dissolving 50 milliliter (mL) of tetraethyl orthosilicate ($Si(OC_2H_5)_4$), 12.94 grams (g) of lead (II) nitrate ($Pb(NO_3)_2$), and 11.62 g of zinc nitrate hexahydrate ($Zn(NO_3)_2 \cdot 6H_2O$) in 125 mL of distilled water. Subsequently, 30 mL of concentrated $NH_4OH$ (30%) was further gradually added to the initial solution under continuous stirring at room temperature for 30 minutes. The precipitate formed was filtered and thoroughly washed with distilled water. The washed precipitate was dried at 100° C. for 6 hours. Further, the dried material was calcined at 850° C. for 3 hours, to obtain the final $SiO_2/Zn_2SiO_4/Pb_2SiO_4$ nanocomposite.

Results

Figure 2:
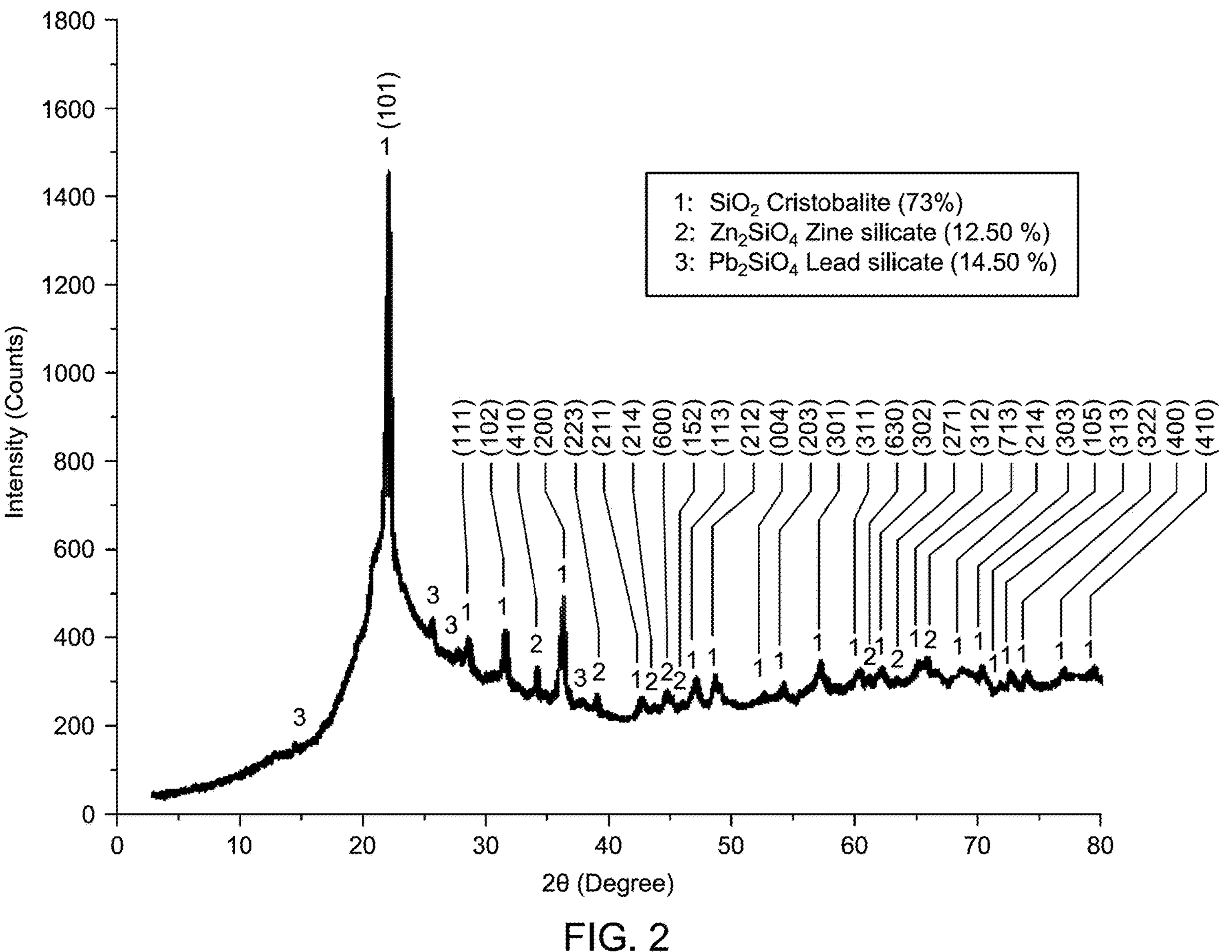
FIG. 2 shows X-ray diffraction (XRD) pattern of a $SiO_2/Zn_2SiO_4/Pb_2SiO_4$ nanocomposite, according to certain embodiments.

The X-ray diffraction (XRD) pattern for the synthesized nanocomposite is shown in FIG. 2, illustrating the structural composition of the synthesized nanocomposite. The pattern indicated the presence of 73% $SiO_2$ cristobalite, 12.50% $Zn_2SiO_4$ zinc silicate, and 14.50% $Pb_2SiO_4$ lead silicate, as listed in Table 1 herein below. The $SiO_2$ cristobalite phase was identified with International Centre for Diffraction Data (ICDD) card number JCPDS No. 00-011-0695, the disclosure of which is incorporated herein by reference in its entirety and crystallizes in a tetragonal system. $Zn_2SiO_4$ zinc silicate corresponded to International Centre for Diffraction Data (ICDD) card number JCPDS No. 00-008-0492, the disclosure of which is incorporated herein by reference in its entirety and crystallizes with a rhombohedral crystal system. Further, $Pb_2SiO_4$ lead silicate was confirmed but did not have a specified crystal system in the database and matches International Centre for Diffraction Data (ICDD) card number JCPDS No. 00-030-0724, the disclosure of which is incorporated herein by reference in its entirety. The average crystallite size of the synthesized nanocomposite was 78.78 nanometer (nm), as determined by X-Ray Diffraction. The diffraction peaks corresponding to $SiO_2$ cristobalite were observed at 2θ° values of 21.81°, 28.44°, 31.48°, 36.19°, 42.59°, 46.89°, 48.68°, 52.57°, 54.03°, 57.07°, 60.23°, 62.02°, 65.06°, 68.62°, 70.29°, 71.77°, 72.61°, 73.87°, 76.92°, and 79.29°. The corresponding diffractions originated from the planes with respective Miller indices (101), (111), (102), (200), (211), (113), (212), (004), (203), (301), (311), (302), (312), (214), (303), (105), (313), (322), (400), and (410). The peaks for $Zn_2SiO_4$ zinc silicate appeared at 2θ° values of 34.09°, 38.92°, 43.54°, 44.79°, 45.85°, 61.07°, 63.27°, and 65.79° with corresponding Miller indices (410), (223), (214), (600), (152), (630), (271), and (713). $Pb_2SiO_4$ lead silicate exhibited peaks at 2θ° values of 14.48°, 25.49°, 27.59°, and 37.67°. The XRD analysis confirmed the crystallographic features and phase percentage of the synthesized nanocomposite.

TABLE 1

Structural and crystallographic properties of the synthesized nanocomposite components.

| Components of synthesized nanocomposite | | | | | Average crystallite |
|---|---|---|---|---|---|
| Phase | Chemical name | Percentage by Weight of Nano-composite (wt. %) | International Centre for Diffraction Data (ICDD) Card No. | Crystal system | size of synthesized nano-composite (nm) |
| $SiO_2$ | Cristobalite | 73.00 | JCPDS-00-011-0695 | Tetragonal | 78.78 |
| $Zn_2SiO_4$ | Zinc silicate | 12.50 | JCPDS-00-008-0492 | Rhombohedron | |
| $Pb_2SiO_4$ | Lead silicate | 14.50 | JCPDS-00-030-0724 | Not known yet | |

Figure 3:
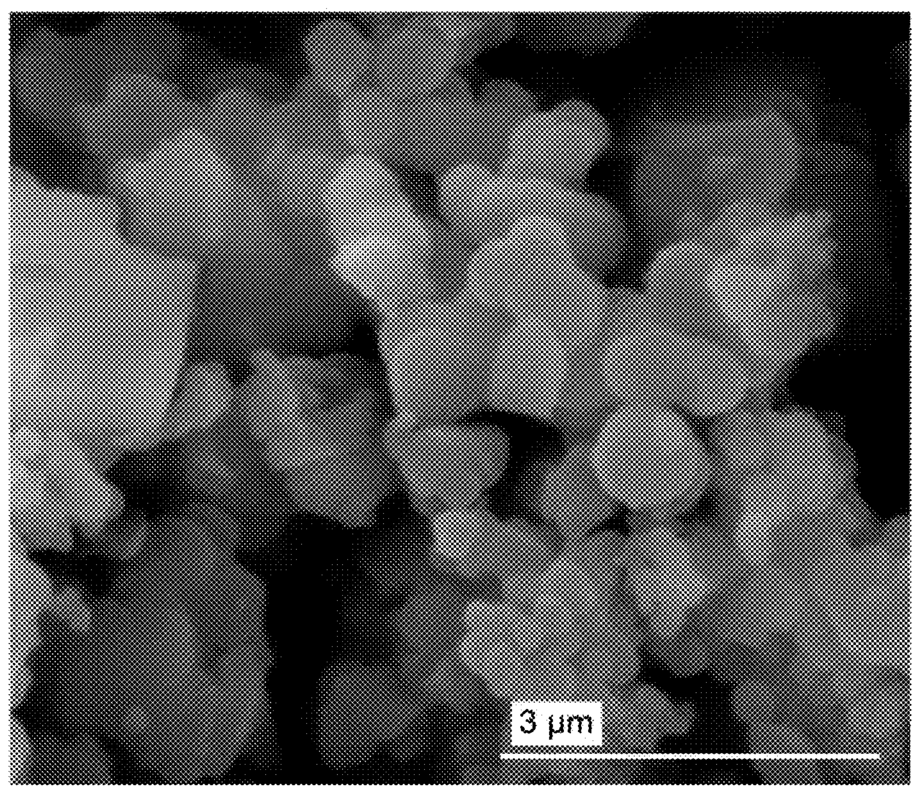
FIG. 3 is a scanning electron microscope (SEM) image of the $SiO_2/Zn_2SiO_4/Pb_2SiO_4$ nanocomposite, according to certain embodiments.

The scanning electron microscope (SEM) image of the synthesized $SiO_2/Zn_2SiO_4/Pb_2SiO_4$ nanocomposite revealed the detailed morphology and surface features of the sample, as shown in FIG. 3. The surface image illustrates a heterogenous morphology. More particularly, the nanocomposite material comprises a combination of spherical, cuboidal, and acicular structures. A fraction of the cuboidal particles have a particle diameter greater than 1 μm, whereas a fraction of the spherical particles have a particle diameter less than 0.5 μm. The particle distribution demonstrates agglomeration and connectivity, particularly of the spherical particles thereof, which is considered to be advantageous for various potential applications. The average grain size of the nanocomposite, as determined by SEM, was 401.05 nm.

Figure 4:
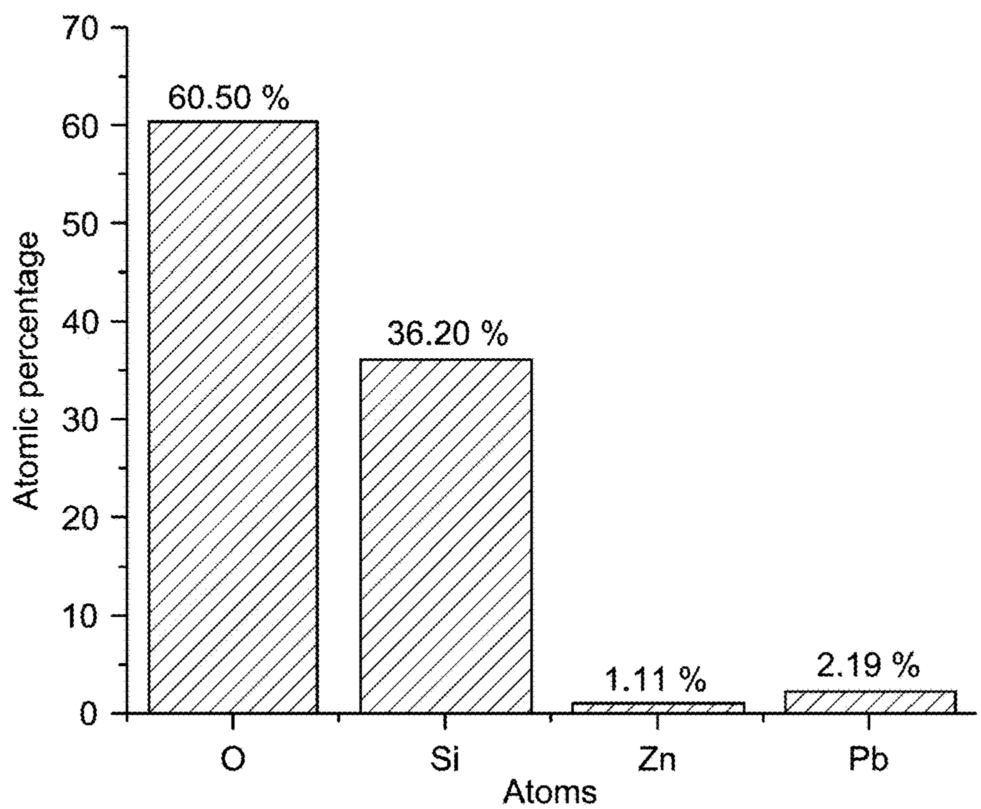
FIG. 4 is a graph depicting the results of the energy-dispersive X-ray (EDX) spectroscopic analysis of the distribution of atomic percentages of elements in the $SiO_2/Zn_2SiO_4/Pb_2SiO_4$ nanocomposite, according to certain embodiments.

FIG. 4 illustrates the distribution of atomic percentages (at. %) of elements in the synthesized $SiO_2/Zn_2SiO_4/Pb_2SiO_4$ nanocomposite, as determined by energy dispersive X-ray (EDX) analysis. The elemental composition revealed that oxygen (O) constitutes 60.50% of the total atomic content, followed by silicon (Si) at 36.20%, zinc (Zn) at 1.11%, and lead (Pb) at 2.19%. The high percentage (%) of oxygen and silicon confirmed the dominant presence of $SiO_2$ in the composite, while the smaller percentages of zinc and lead indicated the incorporation of $Zn_2SiO_4$ and $Pb_2SiO_4$ phases. The above defined composition established the successful synthesis and integration of all components within the nanocomposite as designed.

Further, the use of the synthesized nanocomposite for the removal of Cd(II) ions from aqueous media was investigated by evaluating the effect of pH on the adsorption process. A 100 mL Cd(II) solution with an initial concentration ($C_o$) of 100 mg/L was adjusted to pH values ranging from 2.5 to 6.5 using 0.1 M hydrochloric acid (HCl) or sodium hydroxide (NaOH). Subsequently, 0.05 g of the synthesized nanocomposite was added to the solution, and the mixture was stirred at 298 kelvin (K) for 180 minutes. The adsorption capacity (Q, mg/g) was calculated using the following equation (1):

$$Q=(C_o-C_e)\times\frac{V}{W} \tag{1}$$

Wherein: '$C_o$' (mg/L) and '$C_e$' (mg/L) are respectively the initial and final concentration of Cd(II) ions; 'V' is the volume of Cd(II) solution; and, 'W' is the amount of nanocomposite.

Figure 5:
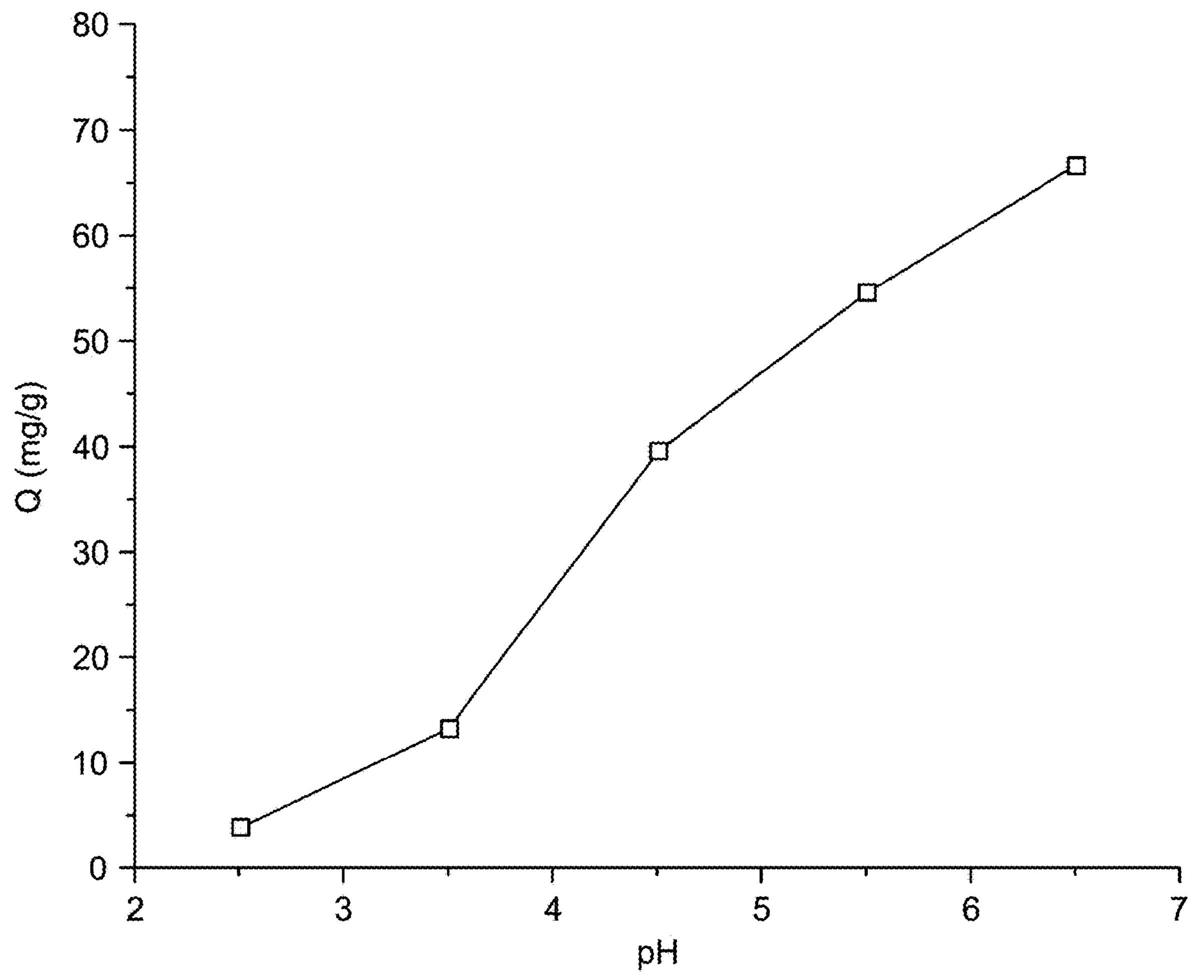
FIG. 5 shows removal of Cd(II) ions from aqueous media using $SiO_2/Zn_2SiO_4/Pb_2SiO_4$ nanocomposite, according to certain embodiments.

The removal efficiency of Cd(II) ions from aqueous media using the synthesized $SiO_2/Zn_2SiO_4/Pb_2SiO_4$ nanocomposite is shown in FIG. 5. The adsorption capacity (Q) of the nanocomposite increased progressively with rising pH levels. At pH 2.5, the adsorption capacity was recorded as 3.96 milligram per gram (mg/g), indicating minimal adsorption under highly acidic conditions which is postulated to be due to the competition between hydrogen ions and Cd(II) ions for active adsorption sites. The maximum adsorption capacity of 66.74 mg/g was observed at pH 6.5, where the electrostatic attraction between Cd(II) ions and the nanocomposite surface reached its optimum, highlighting the effective removal capability of the synthesized nanocomposite. The aforementioned analysis underscores the pH-dependent nature of the adsorption process and the potential of the nanocomposite for water purification applications.

The present disclosure addressed critical issues in existing water purification technologies by introducing the $SiO_2/Zn_2SiO_4/Pb_2SiO_4$ nanocomposite fabricated via a sol-gel method. Previous materials and processes for heavy metal removal faced challenges such as low adsorption capacity, limited efficiency across pH ranges, and inadequate structural properties. The introduced nanocomposite overcame the limitations by integrating silica, zinc silicate, and lead silicate into a single composite with enhanced structural and functional properties. The improved morphology and crystallographic features of the nanocomposite provided increased active site availability, making it more effective than existing materials. The nanocomposite demonstrated an adsorption capacity of up to 66.74 mg/g for Cd(II) ions at pH 6.5, with consistent performance across a pH range of 2.5 to 6.5. The material provided stability and efficiency under challenging conditions, ensuring reliable functionality. Hence, the present disclosure provides advanced water purification and environmental remediation technologies.

Numerous modifications and variations of the present disclosure are possible in light of the above teachings. It is, therefore, to be understood that within the scope of the appended claims, the invention may be practiced otherwise than as specifically described herein.

The invention claimed is:

1. A particulate nanocomposite material comprising, as determined by X-ray diffraction:

a $Pb_2SiO_4$ crystalline phase in an amount of from about 5 to about 20 wt. %;

a rhombohedral $Zn_2SiO_4$ crystalline phase in an amount of from about 5 to about 20 wt. %; and, a tetragonal $SiO_2$ crystalline phase in an amount of from about 60 to about 90 wt. %, wherein wt. % is based on the total weight of the $Pb_2SiO_4$, $Zn_2SiO_4$ and $SiO_2$ phases.

2. The particulate nanocomposite material according to claim 1 having a volume average crystallite size, as determined by X-ray diffraction, of from about 75 to about 80 nm.

3. The particulate nanocomposite material according to claim 1 having a volume average crystallite size, as determined by X-ray diffraction, of from about 78 to about 80 nm.

4. The particulate nanocomposite material according to claim 1, wherein the material is in the form of particles having heterogeneous morphology.

5. The particulate nanocomposite material according to claim 1 comprising, as determined by scanning electron microscopy, substantially spherical particles, polygonal particles of a substantially cuboid shape, substantially acicular particles and aggregates thereof.

6. The particulate nanocomposite material according to claim 1 having a median grain size of from about 300 to about 500 nm, as determined by scanning electron microscopy.

7. The particulate nanocomposite material according to claim 1 having a median grain size of from about 350 to about 450 nm, as determined by scanning electron microscopy.

8. The particulate nanocomposite material according to claim 1, wherein, based on the total number of atoms in the particulate composite material, Pb is present in an amount of from about 1 to about 5 atom %, as determined by Energy Dispersive X-ray (EDX) elemental analysis.

9. The particulate nanocomposite material according to claim 1, wherein, based on the total number of atoms in the particulate composite material, Zn is present in an amount of from about 1 to about 5 atom %, as determined by energy dispersive X-ray (EDX) elemental analysis.

10. A method for preparing the particulate nanocomposite material as defined in claim 1, the method comprising:

forming an aqueous solution of a zinc salt, a lead salt and at least one silicate ester of the formula $R_{(4-x)}Si(OR^1)_x$, wherein R and $R^1$ are each independently $C_1$-$C_8$ alkyl and x is an integer of from 1 to 4;

adding aqueous ammonia to the aqueous solution and stirring the obtained mixture for a duration of from about 0.1 to about 2 hours to form a gel;

filtering the gel, washing the obtained residue with water and heating the washed residue under stirring at a temperature of from about 80 to about 200° C. for a sufficient duration to form a dry powder; and, calcining the dry powder at a temperature of from about 700 to about 1000° C. to form the nanocomposite material.

11. The method according to claim 10, wherein the zinc salt is selected from the group consisting of zinc sulfate ($ZnSO_4$), zinc nitrate ($Zn(NO_3)_2$), zinc chloride ($ZnCl_2$) and zinc acetate ($Zn(CH_3COO)_2$).

12. The method according to claim 11, wherein the zinc salt is zinc nitrate ($Zn(NO_3)_2$).

13. The method according to claim 10, wherein the lead salt is selected from the group consisting of lead (II) sulfate ($PbSO_4$), lead (II) nitrate ($Pb(NO_3)_2$), lead (II) chloride ($PbCl_2$) and lead (II) acetate ($Pb(CH_3COO)_2$).

14. The method according to claim 13, wherein the lead salt is lead (II) nitrate ($Pb(NO_3)_2$).

15. The method according to claim 10, wherein R and $R^1$ are each independently $C_1$-$C_6$ alkyl and x is an integer of from 2 to 4.

16. The method according to claim 10, wherein the aqueous solution comprises at least one silicate ester selected from the group consisting of: tetramethyl orthosilicate ($Si(OCH_3)_4$); methyltriethoxy orthosilicate ($Si(CH_3)(OC_2H_5)_3$); tetraethyl orthosilicate ($Si(OC_2H_5)_4$); and, mixtures thereof.

17. The method according to claim 10, wherein the aqueous solution comprises tetraethyl orthosilicate ($Si(OC_2H_5)_4$).

18. The method according to claim 10, wherein the aqueous ammonia is added in a dropwise manner to the aqueous solution.

19. The method according to claim 10, wherein the dry powder is calcined at a temperature of from about 800 to about 900° C. for a duration of from about 2 to about 4 hours to form the nanocomposite material.

20. A method of immobilizing inorganic contaminants disposed in an aqueous medium, the method comprising contacting the aqueous medium with the particulate nanocomposite material as defined in claim 1.

* * * * *